United States Patent
Asakura

[19]
[11] Patent Number: 6,160,931
[45] Date of Patent: Dec. 12, 2000

[54] WAVELENGTH-MULTIPLEXING OPTICAL TRANSMISSION SYSTEM PROVIDED WITH WAVELENGTH SELECTORS

[75] Inventor: Hiroyuki Asakura, Osaka, Japan

[73] Assignee: Matsushita Electric Industrial Co., Ltd., Osaka, Japan

[21] Appl. No.: 09/179,386

[22] Filed: Oct. 27, 1998

[30] Foreign Application Priority Data

Oct. 28, 1997 [JP] Japan .................................... 9-295270

[51] Int. Cl.[7] ...................................................... G02B 6/26
[52] U.S. Cl. .............................. 385/24; 385/37; 359/124; 359/133
[58] Field of Search .................................. 359/133, 124, 359/125; 385/37, 24

[56] References Cited

U.S. PATENT DOCUMENTS

| | | | |
|---|---|---|---|
| 5,673,129 | 9/1997 | Mizrahi ..................................... | 359/124 |
| 5,808,762 | 9/1998 | Vanoli et al. ............................ | 359/124 |
| 5,953,139 | 9/1999 | Nemecek et al. ........................ | 359/124 |
| 5,956,166 | 9/1999 | Ogata et al. ............................. | 359/125 |

FOREIGN PATENT DOCUMENTS

| | | |
|---|---|---|
| 8-84135 | 3/1996 | Japan . |
| 2655479 | 5/1997 | Japan . |
| 9-167998 | 6/1997 | Japan . |

Primary Examiner—Hung N. Ngo
Attorney, Agent, or Firm—Wenderoth, Lind & Ponack, L.L.P.

[57] ABSTRACT

A wavelength-multiplexing optical transmission system includes (a) an optical transmitter 100 for wavelength-multiplexing a plurality of optical signals having different wavelengths and transmitting a wavelength-multiplexed optical signal, (b) an optical fiber cable 4 for transmitting a plurality of transmitted optical signals, and (c) an optical receiver 101 for receiving a plurality of transmitted optical signals. The optical receiver 101 includes a wavelength selector 20 for demultiplexing an optical signal having a predetermined wavelength of a plurality of received optical signals and outputting the demodulated signal. The wavelength selector 20 has comb-shaped wavelength selection characteristics for selectively filtering an optical signal having a plurality of selected wavelengths. A wavelength selection interval $\Delta\lambda$ between two adjacent selected wavelengths of the wavelength selection characteristics is different from a signal wavelength interval $\delta\lambda$ between two adjacent signal wavelengths of a plurality of wavelength-multiplexed optical signals. The difference therebetween is set so that substantially a single optical signal is selectively filtered from a plurality of received optical signals. The wavelength selector 20 includes a wavelength control mechanism 10 for shifting the selected wavelengths of the wavelength selection characteristics, respectively.

12 Claims, 11 Drawing Sheets

First Preferred Embodiment

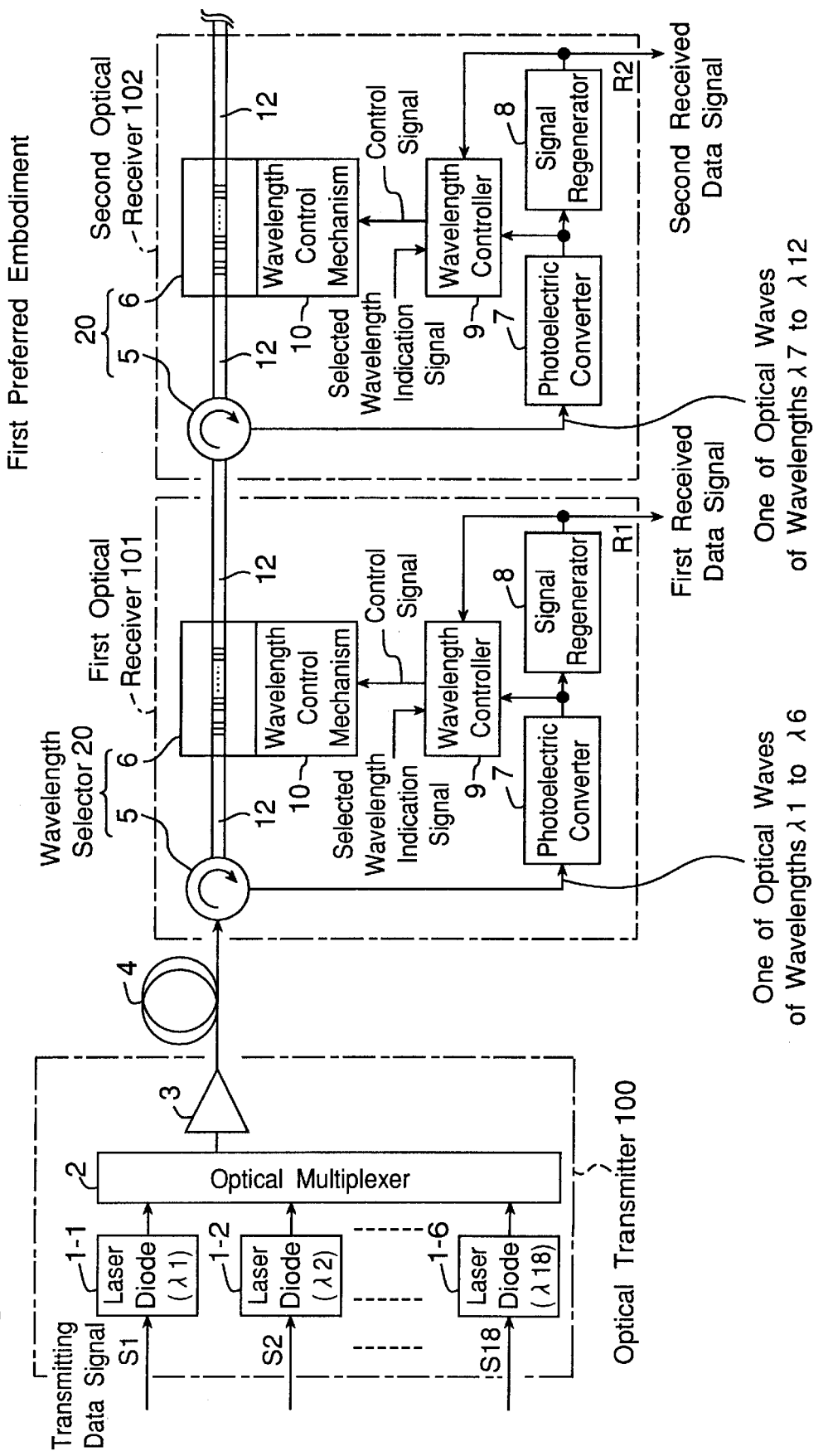

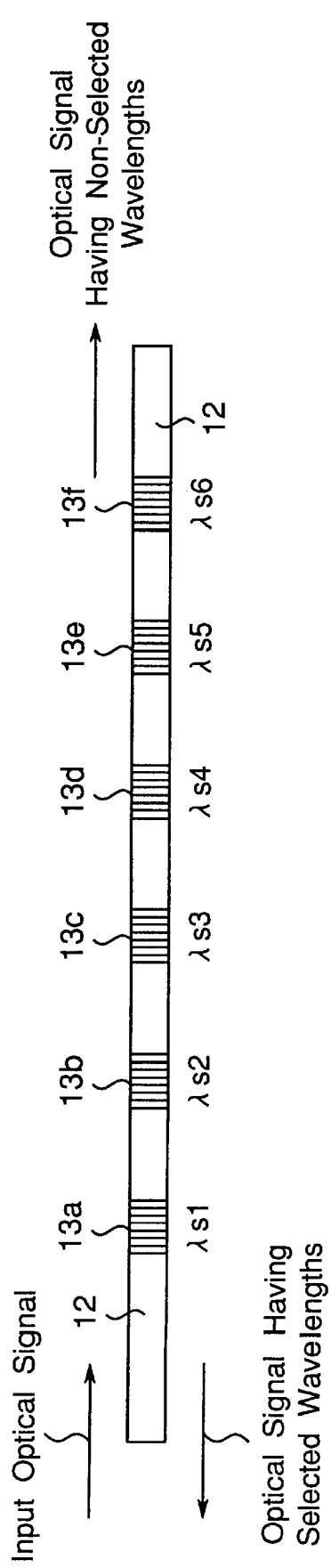

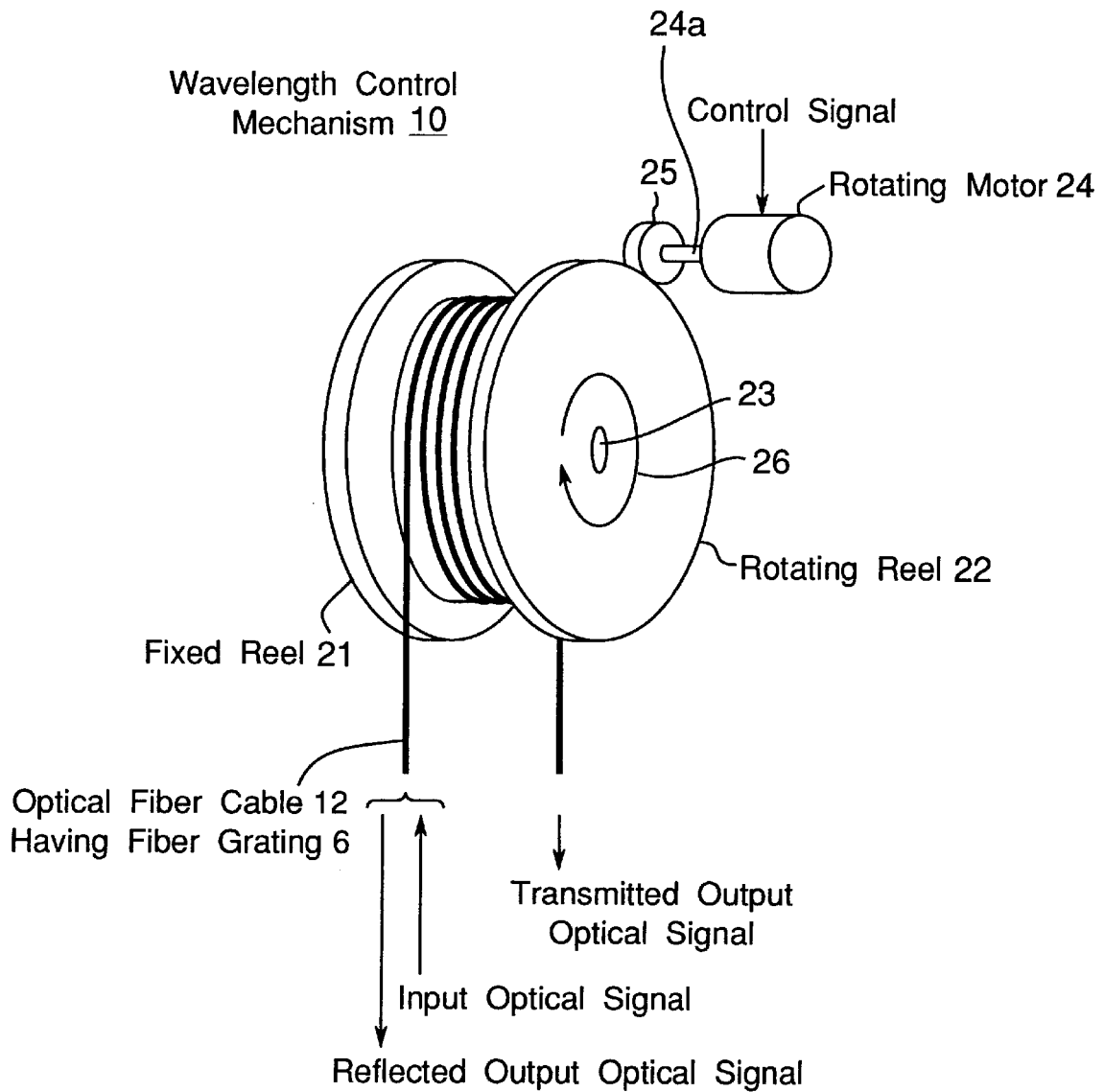

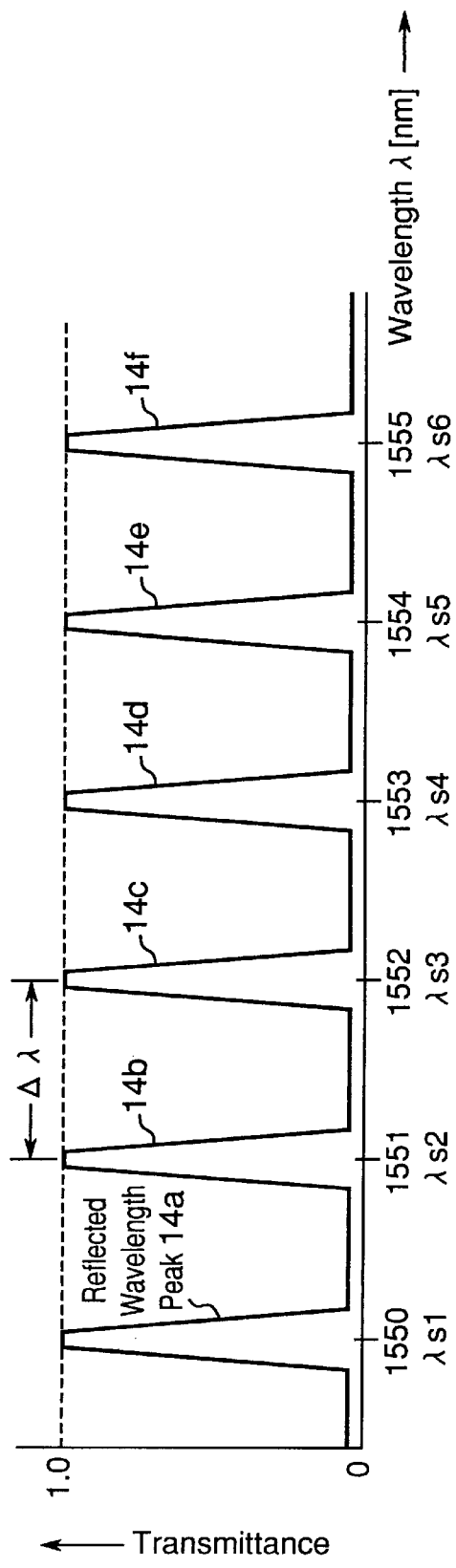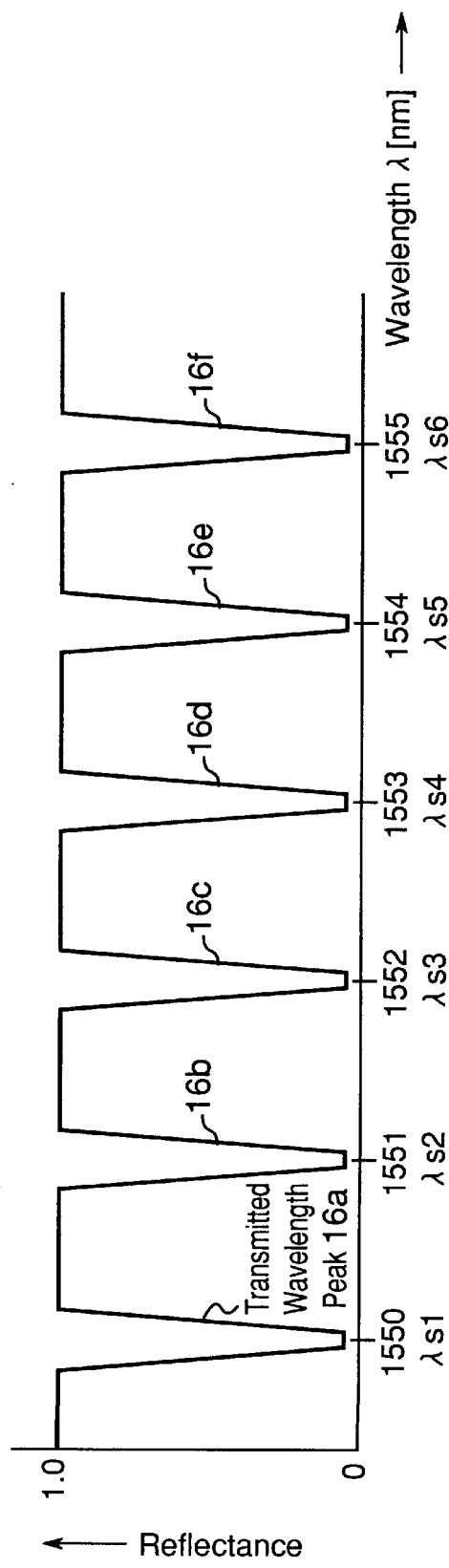

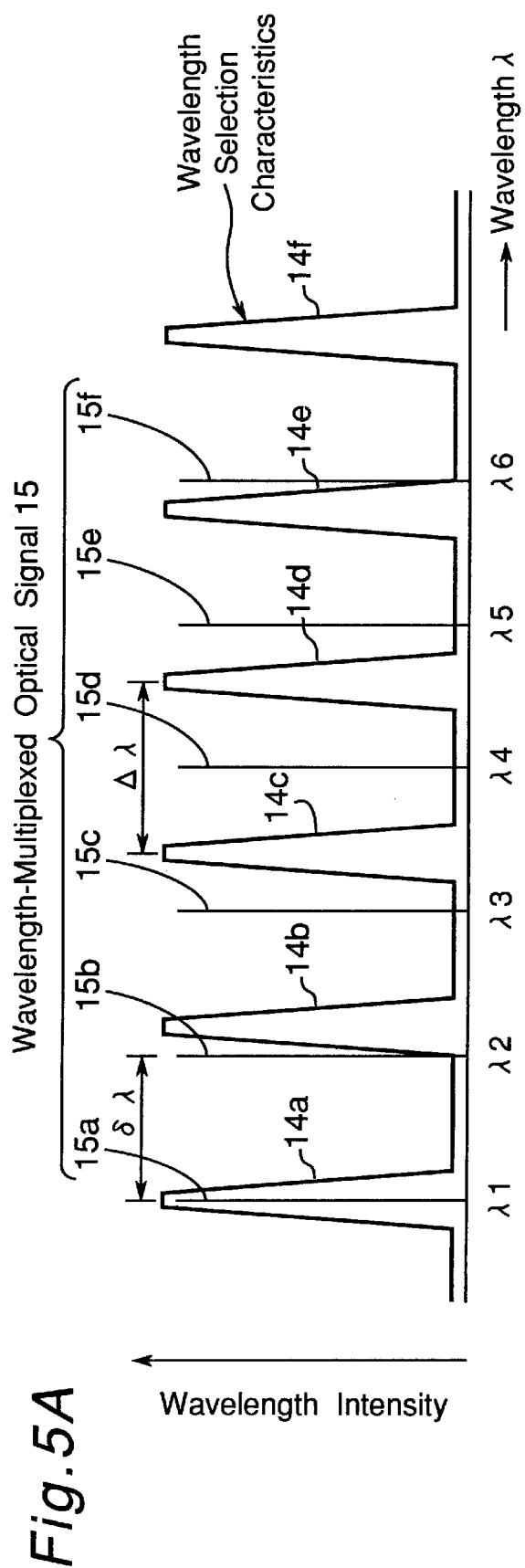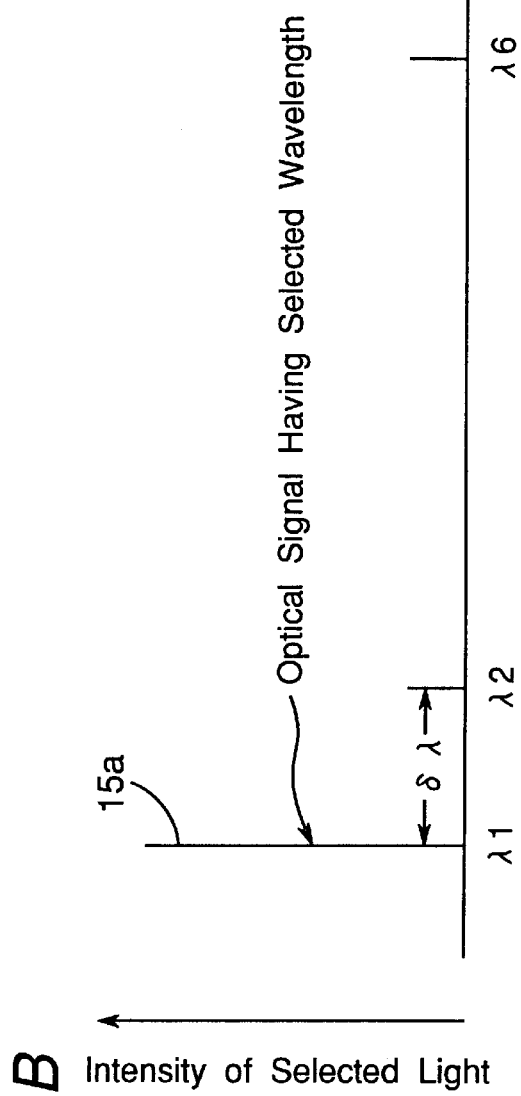
Fig.5A
Fig.5B

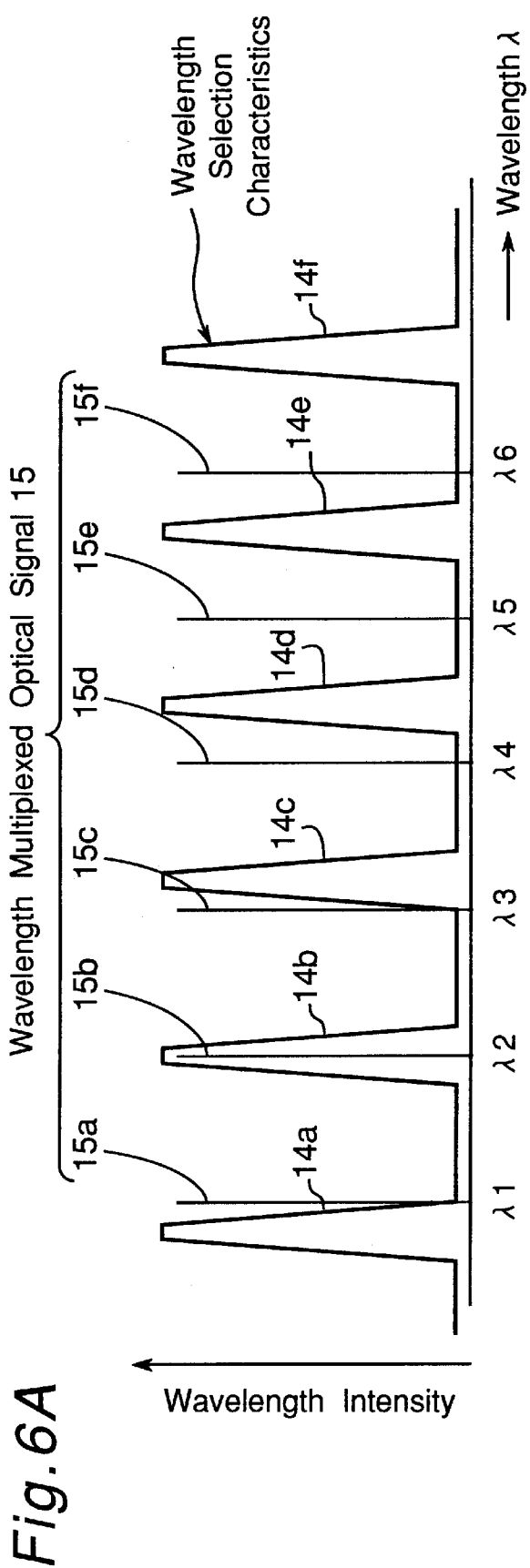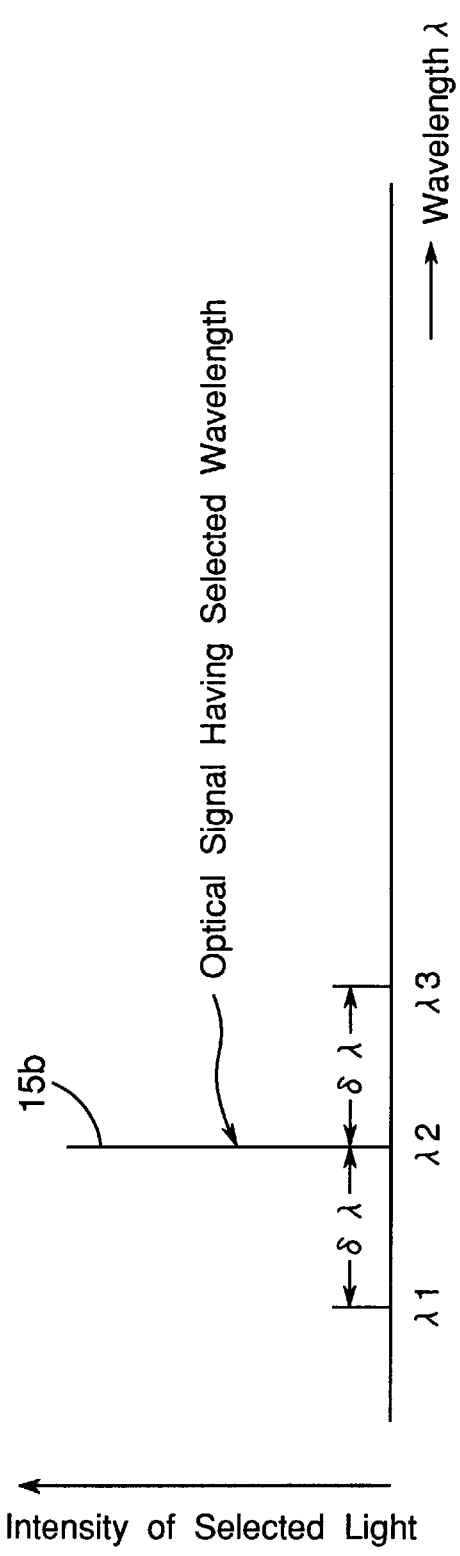

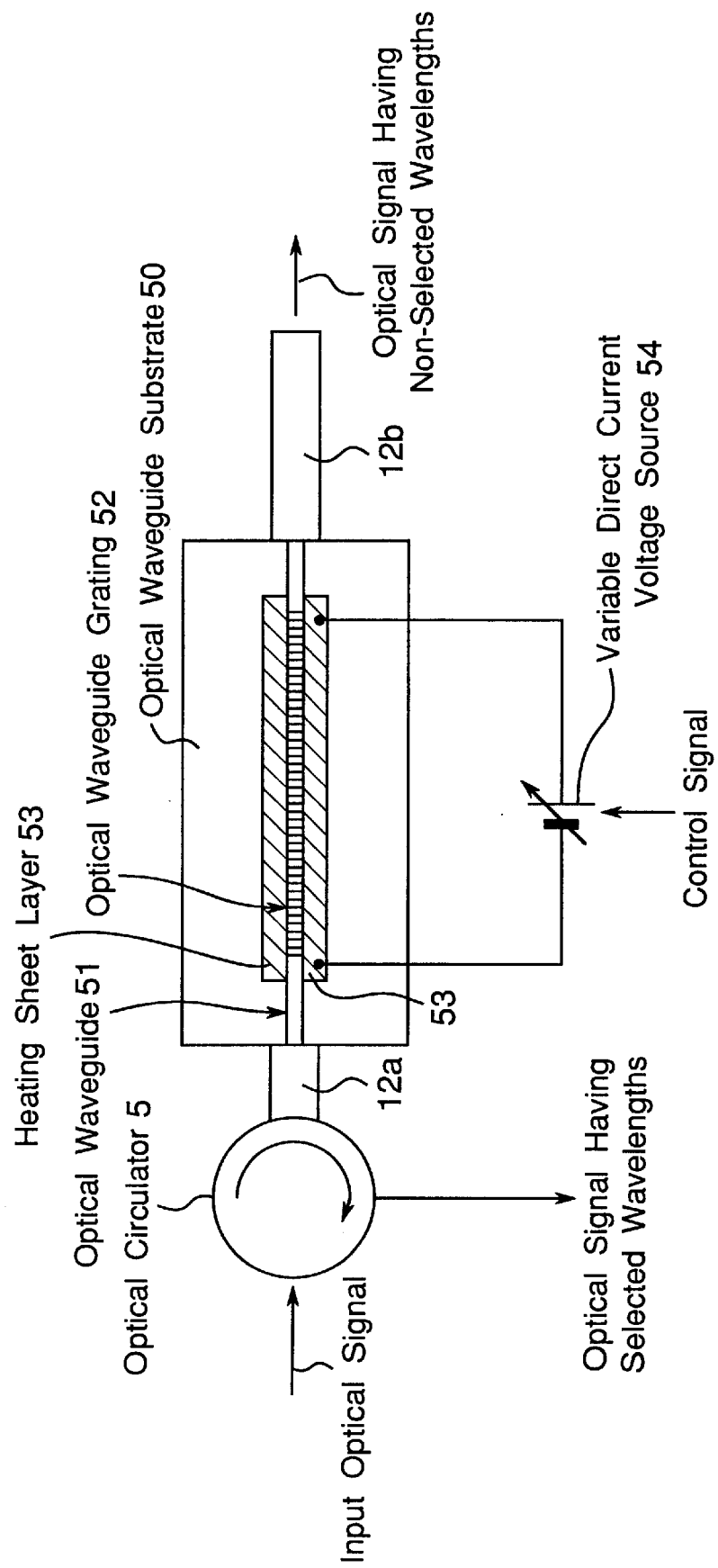

Third Preferred Embodiment

Wavelength Selector 20b

Third Preferred Embodiment

Wavelength Selector 20c

WAVELENGTH-MULTIPLEXING OPTICAL TRANSMISSION SYSTEM PROVIDED WITH WAVELENGTH SELECTORS

BACKGROUND OF THE INVENTION

1. Field of the Invention

The present invention relates to a wavelength-multiplexing optical transmission system, for use in an optical communication system, for transmitting a plurality of wavelength-multiplexed optical signals.

2. Description of the Prior Art

Recently, an optical fiber communication system has been remarkably developed. This system has been thus applied to and put to practical use for a public communication, CATV, a computer network or the like. The optical fiber communication system includes a wavelength-multiplexing optical transmission system, in which multi-channel signals are transmitted through one optical fiber cable. An optical transmitter wavelength-multiplexes respective channel signals by using an optical signal having a different wavelength so as to transmit the signal to an optical receiver through one optical fiber cable. The optical receiver selectively demultiplexes and demodulates the optical signal having a desired wavelength by a wavelength selector. Furthermore, a high-speed Local Area Network (LAN) system having a switching function and a smaller cost is constructed by using the wavelength selector which taps the optical signal alone of a predetermined wavelength but lets the other optical signals pass therethrough. This is disclosed, for example, in the prior art document 1, Masahiro EDA et al., "A Hybrid Optical Local Area Network Using Photonic Wavelength-Division Multiplexing Technique", Technical report of IEICE (Institute of Electronics, Information and Communication Engineers), OQE-91-126 and OCS-91-61, pp. 61–68, 1992.

FIG. 10 is a block diagram showing a constitution of a wavelength selector for use in a prior art wavelength-multiplexing optical transmission system.

Referring to FIG. 10, the prior art wavelength selector comprises an optical circulator 80 and a fiber grating 82 including a diffraction grating formed in an optical fiber cable 81. The optical circulator 80 is a circulator for circulating the optical signal in the clockwise direction. The optical circulator 80 includes a first port, a second port, and a third port which are arranged in the clockwise direction. The optical signal is inputted to the first port thereof, and the optical fiber cable 81 is connected to the second port thereof. The optical signal having a predetermined wavelength is reflected by the fiber grating 82 of the above-described optical fiber cable 81, and then outputted from the third port of the optical circulator 80. On the other hand, the optical fiber cable 81 transmits optical signals other than the reflected optical signal having the predetermined wavelength as described above. These optical signals are then outputted from the other end of the optical fiber cable 81. As well known, the fiber grating 82 comprises a periodical refractive index distribution, which is formed in a core of the optical fiber cable 81 by ultraviolet rays. A formation of the fiber grating 82 is disclosed, for example, in the prior art document 2, Akira INOUE et al., "Fabrication and Application of Fiber Bragg Grating", Technical report of IEICE (Institute of Electronics, Information and Communication Engineers), OPE-94-5, pp. 25–30, May 1994. The prior art reference 2 discloses that a tension force is applied to the fiber grating or the fiber grating is heated, and then this leads to a changing of a pitch of the fiber grating and thus a reflected or transmitted wavelength can be changed.

FIG. 11A is a wavelength spectrum diagram showing wavelength reflection characteristics of the wavelength selector of FIG. 10, and FIG. 11B is a wavelength spectrum diagram showing wavelength transmission characteristics of the wavelength selector of FIG. 10. As apparent from FIG. 11, the wavelength selector has the characteristics for selecting the wavelength of a steeply narrow band. Now, its effective index is indicated by n and its period of the refractive index distribution is indicated by P. In this case, the central wavelength λB of the reflected wavelength is given by the following equation (1).

$$\lambda B = 2 \times n \times P \tag{1}$$

Moreover, a stress is applied to the fiber grating 82 or the fiber grating 82 is heated, and then, this leads to a change of the effective index n, and thus the reflected wavelength can be changed.

FIGS. 12A and 12B are a wavelength spectrum diagrams showing a wavelength selection of the optical signal having one wavelength in the prior art wavelength-multiplexing optical transmission system which selects an wavelength by using the wavelength selector of FIG. 10 or a conventional periodic one such as a Fabry-Pérot etalon, wherein FIG. 12A shows wavelength selection characteristics of the wavelength selector of FIG. 10, and FIG. 12B shows a wavelength-multiplexed optical signal which is allowed to pass through the wavelength selector of FIG. 10.

As apparent from FIGS. 12A and 12B, a wavelength interval Δλ is set to be sufficiently wider than a wavelength interval δλ, where Δλ denotes the wavelength interval between two adjacent reflected wavelengths in the wavelength selection characteristics of the wavelength selector, and δλ denotes the wavelength interval between two adjacent optical signals of a wavelength-multiplexed optical signal 15. That is, the prior art wavelength-multiplexing optical transmission system is constituted in such a manner that the reflected wavelength of the wavelength selector is changed so as to thereby reflect and filter one optical signal alone of a plurality of optical signals 15a to 15f included in the wavelength-multiplexed optical signal 15.

However, the temperature dependence of the wavelength selection characteristics of the fiber grating 82 is about 0.01 nm/deg. The dependency of the tension force thereof is about 0.013 nm/g. Accordingly, for example, when a variable wavelength range of 5 nm is obtained, the temperature and the tension force must be changed, respectively, by about 500 degrees and by 400 g. The optical fiber cable 81 itself maybe therefore damaged. Therefore, the actually variable wavelength range becomes narrower. Thus, the number of optical signals, which can be wavelength-multiplexed, is limited. Consequently, a transmission capacity for an optical transmission apparatus cannot be increased. That is, this results in the wavelength-multiplexing optical transmission system as shown in FIGS. 12A and 12B.

SUMMARY OF THE INVENTION

An essential object of the present invention is therefore to provide a wavelength-multiplexing optical transmission system capable of transmitting a large-capacity optical signal compared with that of the prior art.

In order to achieve the aforementioned objective, according to one aspect of the present invention, there is provided a wavelength-multiplexing optical transmission system comprising:

an optical transmitter for wavelength-multiplexing a plurality of optical signals having different wavelengths, and transmitting a wavelength-multiplexed optical signal;

an optical fiber cable for transmitting the wavelength-multiplexed optical signal transmitted by said transmitter; and an optical receiver for receiving the wavelength-multiplexed optical signal through said optical fiber cable, said optical receiver comprising at least one wavelength selector for demultiplexing an optical signal having a predetermined wavelength of a plurality of received optical signals included in the wavelength-multiplexed optical signal, wherein said wavelength selector has comb-shaped wavelength selection characteristics for selectively filtering optical signals of a plurality of selected wavelengths, wherein a wavelength selection interval $\Delta\lambda$ between two adjacent selected wavelengths of said wavelength selection characteristics is different from a signal wavelength interval $\delta\lambda$ between two adjacent signal wavelengths of said plurality of wavelength-multiplexed optical signals, and the difference between the wavelength selection interval $\Delta\lambda$ and the signal wavelength interval $\delta\lambda$ is set so that substantially a single optical signal is selectively filtered from said plurality of received optical signals by said wavelength selector, and wherein said wavelength selector includes wavelength shifting means for shifting the selected wavelengths of said wavelength selection characteristics, respectively.

In the above-mentioned wavelength-multiplexing optical transmission system, said wavelength selection interval $\Delta\lambda$ is preferably set to be slightly wider than said signal wavelength interval $\delta\lambda$.

In the above-mentioned wavelength-multiplexing optical transmission system, said wavelength selection interval $\Delta\lambda$ is preferably set to be slightly narrower than said signal wavelength interval $\delta\lambda$.

In the above-mentioned wavelength-multiplexing optical transmission system, said wavelength selector preferably has reflection type wavelength selection characteristics for reflecting the optical signal which is selectively filtered.

In the above-mentioned wavelength-multiplexing optical transmission system, said wavelength selector preferably has transmission type wavelength selection characteristics for transmitting the optical signal which is selectively filtered.

In the above-mentioned wavelength-multiplexing optical transmission system, said wavelength selector preferably comprises:

an optical circulator having a first port for inputting said plurality of received optical signals therethrough, a second port for outputting a plurality of optical signals inputted through said first port, and a third port for outputting the optical signals inputted through said second port; and an optical fiber cable having one end connected to said second port, wherein said optical fiber cable comprises a fiber grating including a plurality of diffraction gratings which are formed in said optical fiber cable and have periods corresponding to said plurality of selected wavelengths, and wherein said wavelength shifting means applies a tension force to said optical fiber cable, thereby shifting the selected wavelengths of said wavelength selection characteristics, respectively.

In the above-mentioned wavelength-multiplexing optical transmission system, said wavelength selector preferably comprises:

an optical circulator having a first port for inputting said plurality of received optical signals therethrough, a second port for outputting a plurality of optical signals inputted through said first port, and a third port for outputting the optical signals inputted through said second port; and an optical waveguide having one end connected to said second port, wherein said optical waveguide comprises a fiber grating including a plurality of diffraction gratings which are formed in said optical waveguide and have periods corresponding to said plurality of selected wavelengths, and wherein said wavelength shifting means heats said optical waveguide, thereby shifting the selected wavelengths of said wavelength selection characteristics, respectively.

In the above-mentioned wavelength-multiplexing optical transmission system, said wavelength selector preferably comprises:

an optical wavelength filter for filtering a predetermined wavelength band alone of the optical signals passing through said wavelength selector; and a Fabry-Pérot etalon, having a Fabry-Pérot etalon plate, for selectively filtering optical signals of a plurality of selected wavelengths from the optical signals passing through said wavelength selector, wherein said optical wavelength filter and said Fabry-Pérot etalon are connected in series, and wherein said wavelength shifting means inclines said Fabry-Pérot etalon plate, thereby shifting the selected wavelengths of said wavelength selection characteristics, respectively.

In the above-mentioned wavelength-multiplexing optical transmission system, said wavelength selector preferably comprises:

an optical wavelength filter for filtering a predetermined wavelength band alone of the optical signals passing through said wavelength selector; and a Mach-Zehnder interferometer, in which one optical waveguide for transmitting the optical signal passing through said wavelength selector is branched into two first and second optical waveguides, each having an optical path difference therebetween, and then said first and second optical waveguides are coupled with one another, said Mach-Zehnder interferometer selectively filtering optical signals of a plurality of selected wavelengths from the optical signals passing through said wavelength selector, wherein said optical wavelength filter and said Mach-Zehnder interferometer are connected in series, and wherein said wavelength shifting means heats said second optical waveguide, thereby shifting the selected wavelengths of said wavelength selection characteristics, respectively.

The above-mentioned wavelength-multiplexing optical transmission system preferably further comprises:

a plurality of said wavelength selectors connected in series, wherein the selected wavelengths of said wavelength selectors are set, respectively, in said wavelength selectors, in such a manner that the wavelengths are different from one another, so that the wavelengths are allocated at said wavelength selection interval Δλ, and a selected wavelength group is formed.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1 is a block diagram showing a constitution of a wavelength-multiplexing optical transmission system of a first preferred embodiment according to the present invention;

FIG. 2 is a block diagram showing a constitution of a fiber grating 6 of FIG. 1;

FIG. 3 is a perspective view showing a constitution of a wavelength control mechanism 10 of FIG. 1;

FIG. 4A is a wavelength spectrum diagram showing wavelength reflection characteristics of the fiber grating 6 of FIG. 1;

FIG. 4B is a wavelength spectrum diagram showing wavelength transmission characteristics of the fiber grating 6 of FIG. 1;

FIGS. 5A and 5B are wavelength spectrum diagrams of the wavelength selection of an optical signal having a wavelength λ1 by a wavelength selector 20 of FIG. 1, wherein FIG. 5A shows wavelength selection characteristics of the wavelength selector 20 and the wavelength-multiplexed optical signal, and FIG. 5B shows an optical signal having the wavelength selected by the wavelength selector 20;

FIGS. 6A and 6B are wavelength spectrum diagrams showing a wavelength selection of the optical signal having a wavelength λ2 by the wavelength selector 20 of FIG. 1, wherein FIG. 6A shows wavelength selection characteristics of the wavelength selector 20 and the wavelength-multiplexed optical signal, and FIG. 6B shows an optical signal having the wavelength selected by the wavelength selector 20;

FIG. 7 is a block diagram showing a constitution of a wavelength selector 20a for use in the wavelength-multiplexing optical transmission system of a second preferred embodiment according to the present invention;

FIGS. 12A and 12B are wavelength spectrum diagrams of the wavelength selection of the optical signal having one wavelength in the prior art wavelength-multiplexing optical transmission system which selects a wavelength by using the wavelength selector of FIG. 10 or a conventional periodic one such as a Fabry-Pérot etalon, wherein FIG. 12A shows wavelength selection characteristics of the wavelength selector of FIG. 10, and FIG. 12B shows a wavelength-multiplexed optical signal which is allowed to pass through the wavelength selector of FIG. 10.

DETAILED DESCRIPTION OF THE PREFERRED EMBODIMENTS

Figure 8:
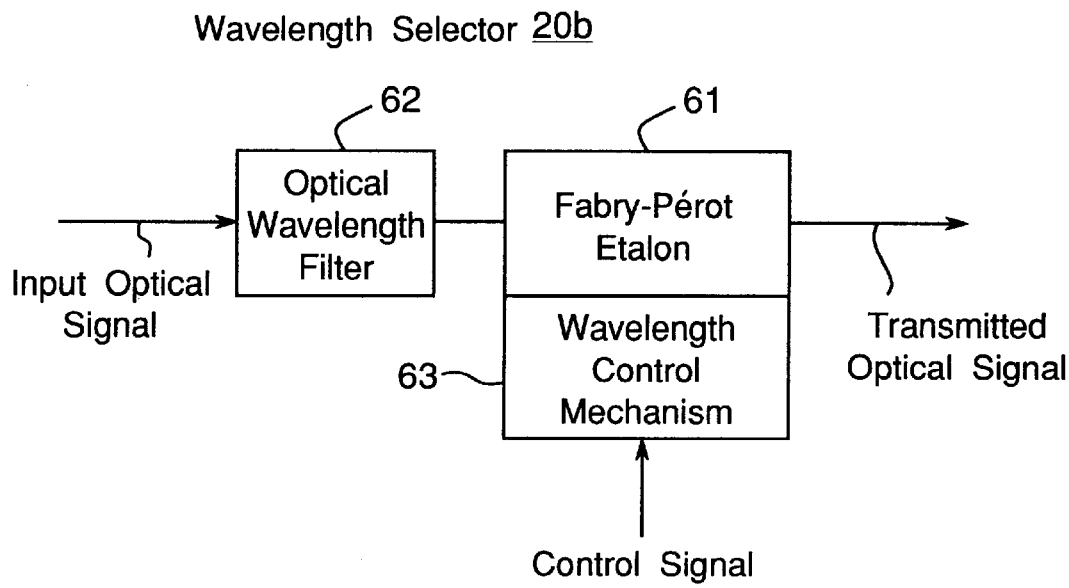
FIG. 8 is a block diagram showing a constitution of a wavelength selector 20b for use in the wavelength-multiplexing optical transmission system of a third preferred embodiment according to the present invention.

Preferred embodiments according to the present invention will be described below with reference to the accompanying drawings.

FIRST PREFERRED EMBODIMENT

FIG. 1 is a block diagram showing a constitution of a wavelength-multiplexing optical transmission system of a first preferred embodiment according to the present invention.

As shown in FIG. 1, in the wavelength-multiplexing optical transmission system of the first preferred embodiment, an optical transmitter 100 is connected to a first optical receiver 101 through an optical fiber cable 4. In an arrangement from the first optical receiver 101, three optical receivers 101 to 103 (103 not shown in FIG. 1) are connected in series, for example. Each of the optical receivers 101 to 103 is characterized in including a wavelength selector 20 having a fiber grating 6. This preferred embodiment provides the wavelength-multiplexing optical transmission system in which a large-capacity signal can be transmitted by expanding a wavelength selection range of the wavelength selector 20 that receives a plurality of optical signals of different wavelengths and demultiplexes the wavelength-multiplexed optical signals.

Referring to FIG. 1, transmitting data signals S1 to S18 are inputted to laser diodes 1-1 to 1-18, respectively. In response to this, the laser diodes 1-1 to 1-18 modulate the intensity of the optical signals, which oscillate in accordance with the inputted transmitting data signals S1 to S18, respectively. Then, the laser diodes 1-1 to 1-18 output the modulated optical signals to an optical multiplexer 2. The optical multiplexer or combiner 2 outputs a plurality of inputted optical signals to a first port of an optical circulator 5 in the first optical receiver 101 through an optical amplifier 3 and the optical fiber cable 4. The wavelength selector 20 comprises the optical circulator 5 and the fiber grating 6 formed in an optical fiber cable 12. The wavelength selector 20 selectively filters and reflects the optical signal alone of one predetermined wavelength of the optical signals which are incident into the optical circulator 5, while the wavelength selector 20 transmits the other optical signals through the optical fiber cable 12. The optical circulator 5 is the circulator for clockwise circulating the optical signals, which are incident into the first port. The optical circulator 5 includes the first port, a second port, and a third port which are arranged in the clockwise direction. The fiber grating 6 formed in the optical fiber cable 12 is connected to the second port through the optical fiber cable 12. The optical signal having the predetermined wavelength is reflected by the above-mentioned fiber grating 6, and then outputted to a photoelectric converter 7 from the third port. The optical signals not reflected by the fiber grating 6 are outputted to the following-stage second optical receiver 102 through the optical fiber cable 12. A wavelength control mechanism 10 for shifting the reflected wavelength of the fiber grating 6 is connected to the fiber grating 6, as described in detail below.

The photoelectric converter 7 photoelectrically converts the inputted optical signal into an electric signal and then outputs the electric signal to a wavelength controller 9 and a signal regenerator 8. In response to this, the signal regenerator 8 regenerates a synchronizing signal from the inputted electric signal and regenerates a first received data signal R1 in accordance with the synchronizing signal. Then, the signal regenerator 8 outputs the signal R1 to an external apparatus and the wavelength controller 9. The wavelength controller 9 controls the wavelength control mechanism 10 so that the optical signal having the wavelength indicated by a selected wavelength signal inputted from the external apparatus can be reflected by the fiber grating 6 of the wavelength selector 20, the inputted electric signal is at maximum and the data signal included in the optical signal having the indicated wavelength can be regenerated by the signal regenerator 8.

A plurality of wavelength-multiplexed optical signals transmitted from the optical transmitter 100 of this preferred embodiment include:

(1) a first optical signal group comprised of the optical signals of wavelengths $\lambda 1$ to $\lambda 6$ allocated at the wavelength interval $\delta\lambda$;

(2) a second optical signal group comprised of the optical signals of wavelengths $\lambda 7$ to $\lambda 12$ allocated at the wavelength interval $\delta\lambda$; and (3) a third optical signal group comprised of the optical signals of wavelengths $\lambda 13$ to $\lambda 18$ allocated at the wavelength interval $\delta\lambda$.

The wavelength interval between the first and second signal groups and the wavelength interval between the second and third signal groups are set to the wavelength intervals which are sufficiently wider than the above-described wavelength interval $\delta\lambda$. The second and third optical receivers 102 and 103 are constituted in a manner similar to that of the first optical receiver 101. In the first optical receiver 101, the wavelength selector 20 selectively filters and reflects the optical signal alone of one wavelength of the wavelengths $\lambda 1$ to $\lambda 6$, while the wavelength selector 20 transmits the optical signals of the other wavelengths. In the second optical receiver 102, the wavelength selector 20 selectively filters and reflects the optical signal alone of one wavelength of the wavelengths $\lambda 7$ to $\lambda 12$, while the wavelength selector 20 transmits the optical signals of the other wavelengths. In the third optical receiver 103, the wavelength selector 20 selectively filters and reflects the optical signal alone of one wavelength of the wavelengths $\lambda 13$ to $\lambda 18$, while the wavelength selector 20 transmits the optical signals of the other wavelengths. That is, there are provided a plurality of wavelength selectors 20 connected in series. The wavelengths selected by the wavelength selectors 20 are set in the wavelength selectors 20 in such a manner that the wavelengths are different from one another, so that the wavelengths are allocated at the wavelength selection interval $\Delta\lambda$, and a selected wavelength group is formed.

FIG. 2 is a block diagram showing a detail constitution of the fiber grating 6 of FIG. 1. For example, as disclosed in the cited reference 2, the fiber grating 6 has a diffraction grating, which is formed in, for instance, the multi-mode optical fiber cable 12 for use in an optical communication system by a light of a short wavelength. A formation of the diffraction grating is accomplished by partially increasing a refractive index in a core of the optical fiber cable 12 by an exposure of a beam interference or an exposure of an interference using a phase mask, using an ultraviolet light of the wavelength of about 240 nm. As shown in FIG. 2, each of diffraction gratings 13a to 13f having predetermined periods reflects the light alone of the wavelength corresponding to the period, while they transmit the other lights. That is, in FIG. 2, the diffraction gratings 13a to 13f reflect the optical signals alone of wavelengths $\lambda s1$ to $\lambda s6$, respectively, while they transmit the optical signals of the other wavelengths. The diffraction gratings 13a to 13f, each having a different period, are therefore formed in one optical fiber cable 12 as shown in FIG. 2 so as to thereby provide the wavelength reflection characteristics which are the comb-shaped wavelength selection characteristics shown in FIG. 4A, and to provide the wavelength transmission characteristics shown in FIG. 4B having the opposite characteristics. The wavelength reflection characteristics have six reflected wavelength peaks 14a to 14f. The wavelength transmission characteristics have six transmitted wavelength peaks 16a to 16f opposite to the six reflected wavelength peaks 14a to 14f. As shown in FIGS. 5 and 6, the optical signal having a predetermined wavelength can be selectively reflected, while the optical signals of the other wavelength scan be passed through the diffraction gratings. The selectively filtered reflected optical signal can be extracted by the optical circulator 5.

FIG. 3 is a perspective view showing a detail constitution of the wavelength control mechanism 10 of FIG. 1.

Referring to FIG. 3, one reel comprises a fixed reel 21 and a rotating reel 22 which are formed so as to be separated from one another from one reel on a division plane perpendicular to a shaft 23. The optical fiber cable 12 including the fiber grating 6 is wound around the fixed reel 21 and the rotating reel 22. The rotation of the fixed reel 21 is fixed, while the rotating reel 22 is supported by the shaft 23 so as to be rotated around the shaft 23. A shaft 24a of a rotating motor 24 is coupled to a rotation drive ring 25. In response to a control signal, the rotating motor 24, for example, a stepping motor is rotated. The rotation drive is transmitted to the rotating reel 22 through the shaft 24a and the rotation drive ring 25. The optical fiber cable 12 on the side of the fixed reel 21 is adhesively fixed to a predetermined position of the fixed reel 21 at the position where its winding is started. Whereas, the optical fiber cable 12 on the side of the rotating reel 22 is adhesively fixed to a predetermined position of the rotating reel 22 at the position where its winding is terminated. When the rotating reel 22 is rotated in the direction of rotation shown by an arrow 26, a tension force can be applied so that the optical fiber cable 12 is drawn in the longitudinal direction of the optical fiber cable 12. It is thereby possible to respectively shift, toward a long wavelength, the reflected wavelength peaks 14a to 14f of the wavelength reflection characteristics and the transmitted wavelength peaks 16a to 16f of the wavelength transmission characteristics shown in FIGS. 4A and 4B.

In this preferred embodiment, as shown in FIGS. 5 and 6, the wavelength selection interval $\Delta\lambda$ of the reflected wavelength characteristics is slightly different from the signal wavelength interval $\delta\lambda$ of the wavelength-multiplexed optical signal. The difference therebetween is set so that substantially a single optical signal can be selectively filtered from a plurality of optical signals. Although the case of $\Delta\lambda > \delta\lambda$ is illustrated in FIGS. 5 and 6, the present invention is not limited to this example, and $\Delta\lambda < \delta\lambda$ may be also set.

For example, when the optical signal having a predetermined wavelength $\lambda 1$ is selectively filtered by the wavelength selector 20, the wavelength reflection characteristics of the fiber grating 6 are as shown in FIG. 5A. The optical signal, which is reflected by the diffraction grating 13a having the period corresponding to the reflected wavelength peak 14a at which the optical signal having the wavelength λ1 is selectively reflected, is selected through the optical circulator 5. Since the other wavelength-multiplexed optical signals (of the wavelengths λ2, λ3, ..., λ18) do not coincide with the reflected wavelength peaks 14b, ..., 14f of the fiber grating 6, the fiber grating 6 transmits these optical signals. As shown in FIG. 5B, the optical signal alone of the selected wavelength λ1 is therefore outputted through the optical circulator 5.

Next, when the optical signal having the wavelength λ2 is selectively filtered, the wavelength control mechanism 10 of FIG. 3 is used so as to reduce the tension force applied to the whole fiber grating 6 and thus to compress the fiber grating 6. This leads to the situation in which the whole reflected wavelength peaks 14a to 14f of the wavelength reflection characteristics are shifted toward the short wavelength, so that the wavelength of the second reflected wavelength peak 14b is allowed to coincide with the wavelength λ2. At this time, the optical signal having the wavelength λ2 is reflected by the fiber grating 6 and then outputted through the optical circulator 5. In a manner similar to above, the wavelength selector 20 of the first optical receiver 101 can select an optional wavelength of the wavelengths λ3 to λ6 by the same principle. In a manner similar to above, the wavelength selector 20 of the second optical receiver 102 can select an optional wavelength of the wavelengths λ7 to λ12. The wavelength selector 20 of the third optical receiver 103 can select an optional wavelength of the wavelengths λ13 to λ18.

For example, the number of wavelength-multiplexed optical signals is indicated by N, and the wavelength selection interval Δλ is set as represented by the following equation (2).

$$\Delta\lambda=\delta\lambda\times\{N/(N-1)\} \quad (2).$$

By the wavelength control mechanism 10, the whole reflected wavelength peaks of the reflected wavelength characteristics of the wavelength selector 20 are shifted, respectively, toward the short wavelength or the long wavelength at the interval of δλ/(N−1). It is thereby possible to select the optical signal alone of a desired wavelength of the wavelength-multiplexed optical signals. In the first preferred embodiment, the number N of the wavelength-multiplexed optical signals received by one optical receiver is set to N=6. However, the present invention is not limited to this example.

In the first preferred embodiment, Δλ>δλ. However, Δλ<δλ may be also set as described above.

Further, for example, the wavelength selection interval Δλ may be set as represented by the following equation (3).

$$\Delta\lambda=\delta\lambda\times\{N/(N+1)\} \quad (3).$$

Then by the wavelength control mechanism 10, the whole reflected wavelength peaks of the reflected wavelength characteristics of the wavelength selector 20 are shifted toward the short wavelength or the long wavelength at the interval of δλ/(N+1). It is thereby possible to select the optical signal alone of a desired wavelength of the wavelength-multiplexed optical signals. In this preferred embodiment, the wavelength selector 20 has a plurality of reflected wavelength peaks. Because of this, unlike the prior art, it is not necessary to change a single selected wavelength of the wavelength selector 20 in a wide range of δλ×(N−1), for example.

At least one of the wavelength selection interval Δλ and the signal wavelength interval δλ is not limited to an equal interval. Although the wavelength interval is expressed herein, a frequency interval may be used.

In the first preferred embodiment, the multi-stage optical receivers are connected in series. It is thus possible to increase not only the number of reflected wavelength peaks of one wavelength selector 20 but also the number of signal wavelengths, namely, the number of data signals to be transmitted.

As described above, according to the first preferred embodiment, the wavelength selection interval Δλ of the reflected wavelength characteristics of the wavelength selector 20 is slightly different from the signal wavelength interval δλ of the wavelength-multiplexed optical signal. The difference therebetween is set so that substantially a single optical signal can be selectively filtered from a plurality of optical signals. It is thus possible to expand the wavelength selection range of the wavelength selector 20, as compared with that of the prior art. It is therefore possible to provide the wavelength-multiplexing optical transmission system capable of transmitting the large-capacity signal by using the wavelength selector 20.

SECOND PREFERRED EMBODIMENT

FIG. 7 is a block diagram showing a constitution of a wavelength selector 20a for use in the wavelength-multiplexing optical transmission system of a second preferred embodiment according to the present invention.

Referring to FIG. 7, the second port of the optical circulator 5 is connected to an optical fiber cable 12a and connected to an optical fiber cable 12b through an optical waveguide 51 formed on an optical waveguide substrate 50 through a heating sheet layer 53. In the same manner as the fiber grating 6 of the first preferred embodiment, the optical waveguide 51 has the diffraction grating including a plurality of diffraction gratings having the period corresponding to the selected wavelength. Thus, the optical waveguide 51 has an optical waveguide grating 52 having a plurality of reflected wavelength peaks. Both the electrodes of a variable direct current voltage source 54 are respectively connected to both the ends of the heating sheet layer 53 that is a thin film heater having a predetermined electrical resistance. A predetermined direct current voltage is applied to the heating sheet layer 53, so that the heating sheet layer 53 generates heat and thus the optical waveguide grating 52 is heated. It is thus possible to respectively shift, toward the long wavelength, the reflected wavelength peaks of the wavelength reflection characteristics and the transmitted wavelength peaks of the wavelength transmission characteristics.

In the above-mentioned second preferred embodiment, the optical waveguide grating 52 is heated, and then the wavelength peaks are shifted, respectively. However, the present invention is not limited to this example. Alternatively, a predetermined direct current electric field may be applied to two electrodes on which the optical waveguide grating 52 is formed so as to be narrower, and then the wavelength peaks are shifted, respectively.

The wavelength-multiplexing optical transmission system using the wavelength selector 20a constituted as described above has the same advantageous effect as that of the first preferred embodiment. This system also has particular advantageous effects as described below. In the structure of the optical waveguide 51 comprising the heating sheet layer 53, the electric field can be easily applied to the core or the heating sheet electrodes can be easily formed on the core. Integration is thus possible and therefore the whole apparatus can be miniaturized. As a result, a manufacturing cost can be reduced.

THIRD PREFERRED EMBODIMENT

FIG. 8 is a block diagram showing a constitution of a wavelength selector 20b for use in the wavelength-multiplexing optical transmission system of a third preferred embodiment according to the present invention. The wavelength selector 20b of the third preferred embodiment comprises a band-pass optical wavelength filter 62 and a Fabry-Pérot etalon 61 including a wavelength control mechanism 63. The functional principle is the same as the principle of the first and second preferred embodiments. However, the Fabry-Pérot etalon 61 is different from the fiber grating 6 in that the Fabry-Pérot etalon 61 exhibits the periodical wavelength transmission characteristics. The optical circulator 5 is not necessary for this preferred embodiment. As well known, the Fabry-Pérot etalon 61 allows the wavelength control mechanism 63 to change, in response to the control signal, the inclined angle of a parallel planar glass or a rock crystal plate referred to as a so-called Fabry-Pérot etalon plate included in the Fabry-Pérot etalon 61, and then it is possible to change the wavelength of one optical signal to be transmitted.

It should be noted that, because of the periodicity of the wavelength transmission characteristics, the optical wavelength filter 62 is inserted in order to exclude the influence of the wavelength outside a transmission bandwidth. The position into which the optical wavelength filter 62 is inserted is not particularly limited. The optical wavelength filter 62 may be inserted into the stage following the Fabry-Pérot etalon 61. Any one of a long wavelength transmission type, a short wavelength transmission type and a band-pass type may be used as the transmission characteristics of the optical wavelength filter 62.

The wavelength selector 20b according to the third preferred embodiment constituted as described above constitutes the transmission type wavelength selector. Unlike the first and second preferred embodiments, the multi-stage optical receivers cannot be connected in series. Accordingly, the wavelength-multiplexing optical transmission system comprising the wavelength selector 20b has the same advantageous effect as the first preferred embodiment except the above fact.

FORUTH PREFERRED EMBODIMENT

Figure 9:
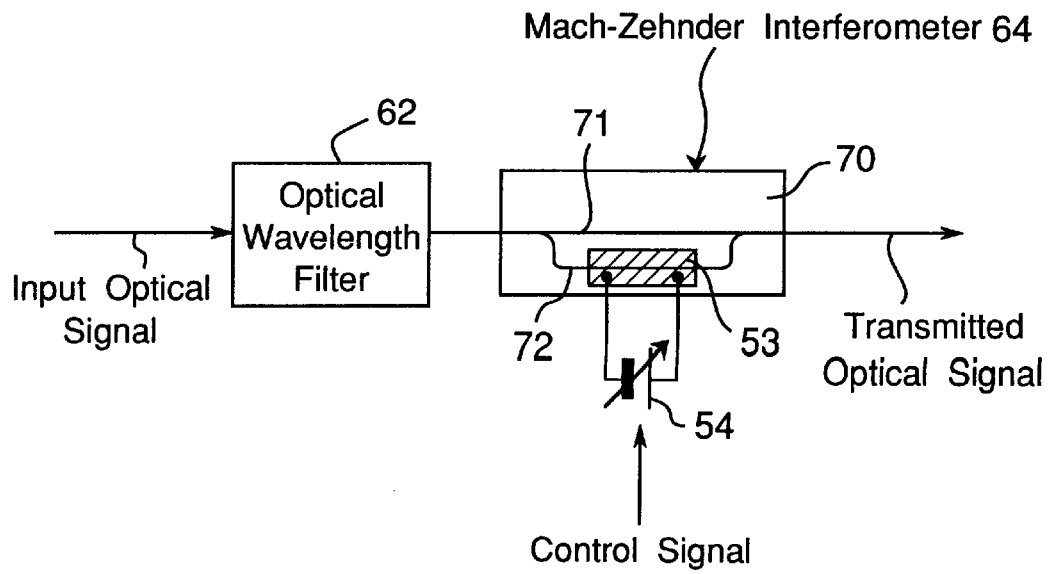
FIG. 9 is a block diagram showing a constitution of a wavelength selector 20c for use in the wavelength-multiplexing optical transmission system of a fourth preferred embodiment according to the present invention.
Figure 10:
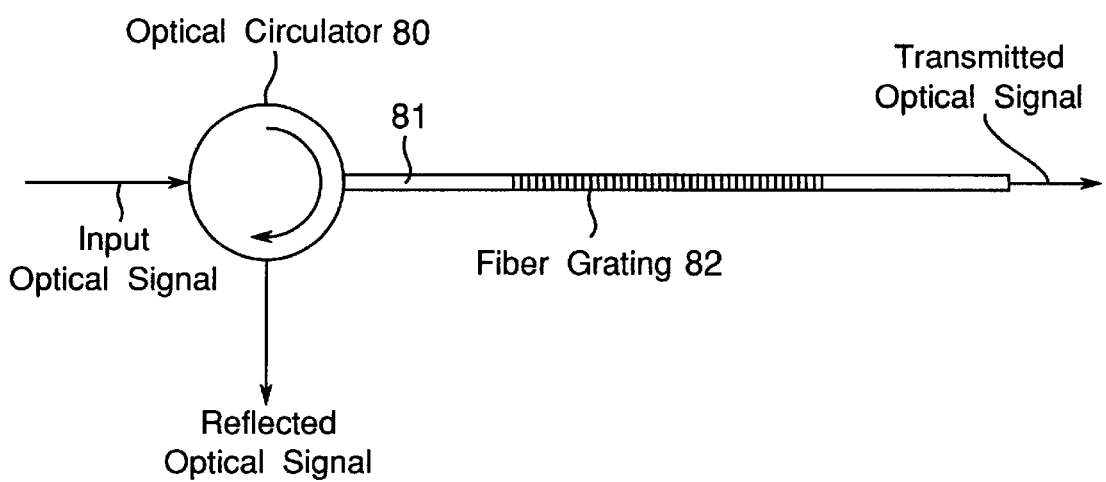
FIG. 10 is a block diagram showing a constitution of the wavelength selector for use in the prior art wavelength-multiplexing optical transmission system.
Figure 11A:
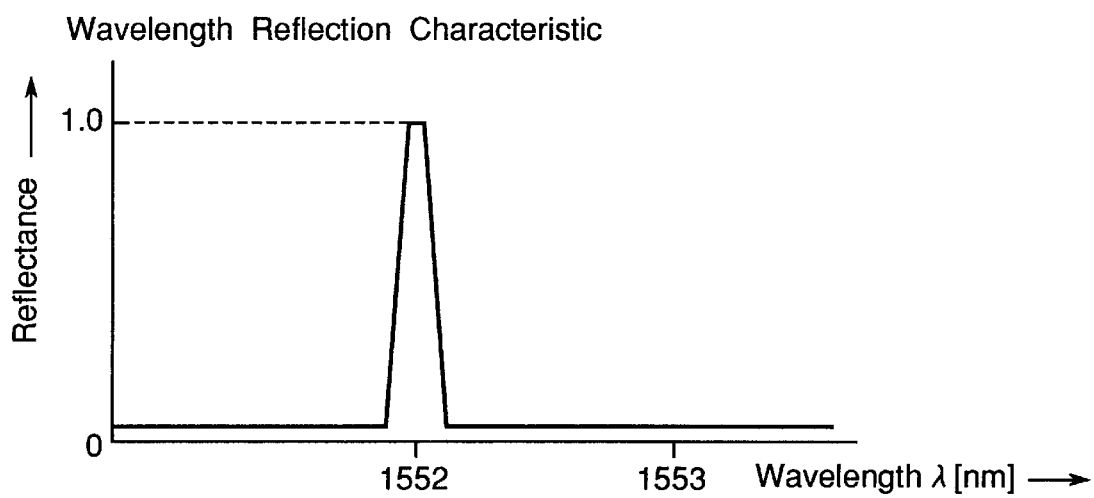
FIG. 11A is a wavelength spectrum diagram showing wavelength reflection characteristics of the wavelength selector of FIG. 10.
Figure 11B:
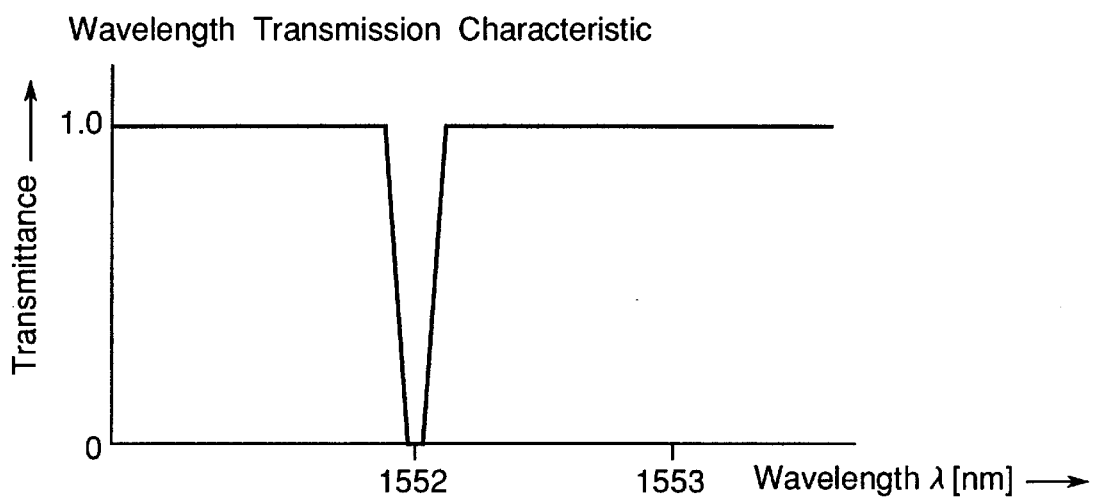
FIG. 11B is a wavelength spectrum diagram showing wavelength transmission characteristics of the wavelength selector of FIG. 10.
Figure 12A:
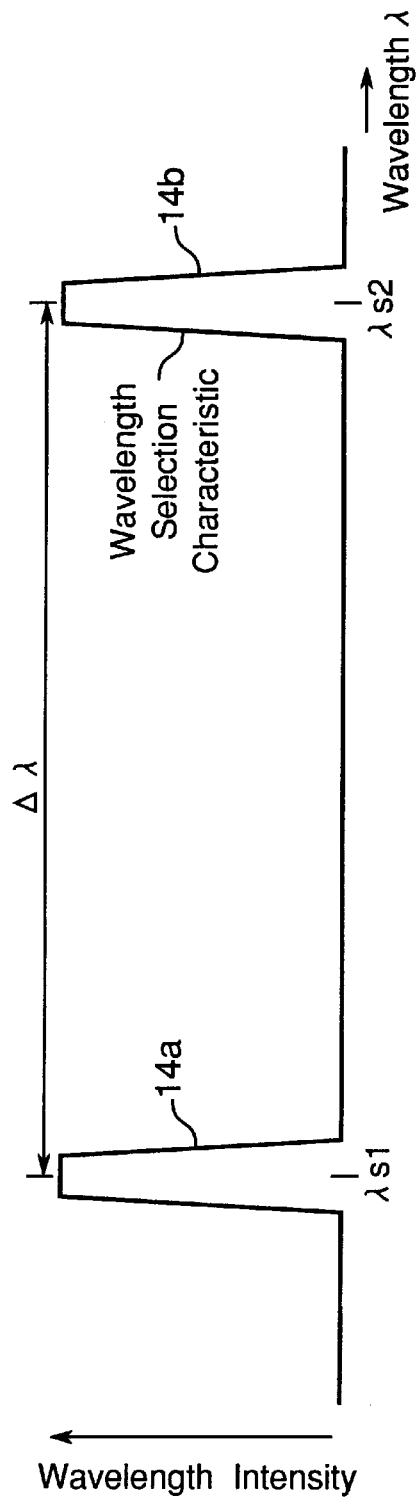
Figure 12B:
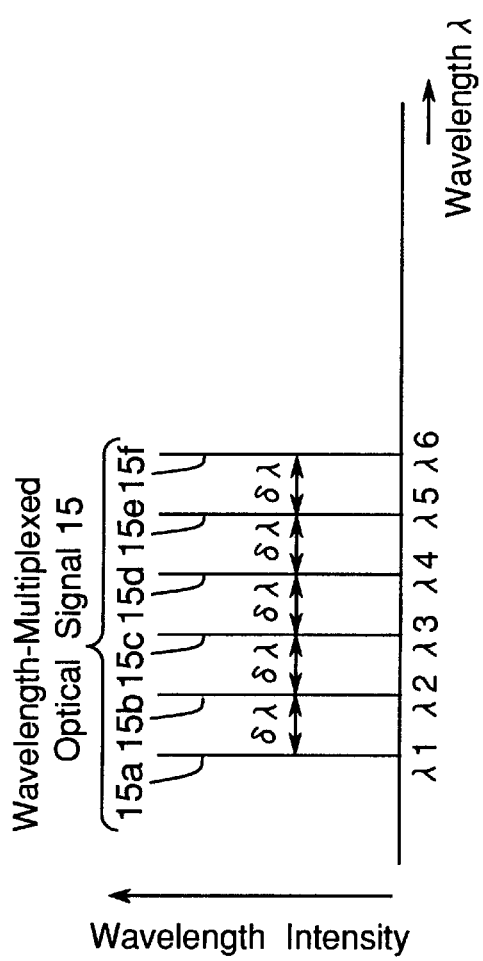

FIG. 9 is a block diagram showing a constitution of a wavelength selector 20c for use in the wavelength-multiplexing optical transmission system of a fourth preferred embodiment according to the present invention. The wavelength selector 20c of the fourth preferred embodiment comprises the optical wavelength filter 62 and a Mach-Zehnder interferometer 64. The Mach-Zehnder interferometer 64 includes two optical waveguides 71 and 72, for branching the optical signal outputted from the optical wavelength filter 62 into two and then transmitting the optical signals, which are formed on an optical waveguide substrate 70. The optical waveguide 72 is formed on the optical waveguide substrate 70 through the heating sheet layer 53 connected to the variable direct current voltage source 54. The two optical waveguides 71 and 72 are coupled so as to thereby multiplex the optical signals passing through the optical waveguides 71 and 72. In this preferred embodiment, an optical path difference is provided between the two optical waveguides 71 and 72, and then the wavelength selection is accomplished and the periodical selection characteristics for the wavelength are obtained. The optical waveguide 72 is heated by the heating sheet layer 53, and then the refractive index of the optical waveguide 72 is increased and thus an optical path length of the optical waveguide 72 is increased. As well known, the Mach-Zehnder interferometer 64 has the transmitted wavelength characteristics having the wavelength selection interval Δλ determined depending on the aforementioned optical path difference. Thus, the above-described heating allows the wavelength selection interval Δλ to be increased, and then the whole transmitted wavelength characteristics can be shifted toward the long wavelength.

It should be noted that, because of the periodicity of the wavelength transmission characteristics, the optical wavelength filter 62 is inserted in order to exclude the influence of the wavelength outside the transmission bandwidth. The position into which the optical wavelength filter 62 is inserted is not particularly limited. The optical wavelength filter 62 may be inserted into the stage following the Mach-Zehnder interferometer 64. Any one of the long wavelength transmission type, the short wavelength transmission type and the band-pass type may be used as the transmission characteristics of the optical wavelength filter 62.

The wavelength selector 20c according to the fourth preferred embodiment constituted as described above constitutes the transmission type wavelength selector. Unlike the first and second preferred embodiments, the multi-stage optical receivers cannot be connected in series. Accordingly, the wavelength-multiplexing optical transmission system comprising the wavelength selector 20c has the same advantageous effect as the first preferred embodiment except that fact. Moreover, the fourth preferred embodiment has the following particular advantageous effects. Since this preferred embodiment comprises the optical waveguides 71 and 72 in a manner similar to that of the second preferred embodiment, the heating sheet electrodes can be easily formed on the core. The integration is thus possible and therefore the whole apparatus can be miniaturized. As a consequence, the manufacturing cost can be reduced.

MODIFIED PREFERRED EMBODIMENT

In the above preferred embodiments, the wavelength control mechanisms 10 and 63, and means for shifting the reflected wavelength characteristics and the transmitted wavelength characteristics of the second and fourth preferred embodiments are used. In this case, a mechanical method of applying the tension force to the optical fiber cable or a method of heating the optical waveguide is used. However, the present invention is not limited to these examples. A known frequency shifter may be used so as to shift the wavelength characteristics.

According to the preferred embodiments of the present invention, as compared with the prior art, it is therefore possible to expand the wavelength selection range of the wavelength selector. It is thus possible to provide the wavelength-multiplexing optical transmission system capable of transmitting the large-capacity signal by using the wavelength selector.

Further, the wavelength selector can be integrated and thus the whole apparatus can be miniaturized. The manufacturing cost can be consequently reduced.

Furthermore, when there are provided a plurality of wavelength selectors connected in series, and then the transmission capacity can be greatly increased.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A wavelength-multiplexing optical transmission system comprising:

an optical transmitter for wavelength-multiplexing a plurality of optical signals having different wavelengths, and transmitting a wavelength-multiplexed optical signal;

an optical fiber cable for transmitting the wavelength-multiplexed optical signal transmitted by said transmitter; and an optical receiver for receiving the wavelength-multiplexed optical signal through said optical fiber cable, said optical receiver comprising at least one wavelength selector for demultiplexing an optical signal having a predetermined wavelength of a plurality of received optical signals included in the wavelength-multiplexed optical signal;

wherein said wavelength selector has comb-shaped wavelength selection characteristics for selectively filtering optical signals of a plurality of selected wavelengths;

wherein a wavelength selection interval $\Delta\lambda$ between two adjacent selected wavelengths of the wavelength selection characteristics is different from a signal wavelength interval $\delta\lambda$ between two adjacent signal wavelengths of the plurality of wavelength-multiplexed optical signals, and the difference between the wavelength selection interval $\Delta\lambda$ and the signal wavelength interval $\delta\lambda$ is set so that substantially a single optical signal is selectively filtered from the plurality of received optical signals by said wavelength selector; and wherein said wavelength selector includes wavelength shifting means for shifting the selected wavelengths of the wavelength selection characteristics, respectively.

2. The wavelength-multiplexing optical transmission system as claimed in claim 1, wherein the wavelength selection interval $\Delta\lambda$ is set to be slightly wider than the signal wavelength interval $\delta\lambda$.

3. The wavelength-multiplexing optical transmission system as claimed in claim 1, wherein the wavelength selection interval $\Delta\lambda$ is set to be slightly narrower than the signal wavelength interval $\delta\lambda$.

4. The wavelength-multiplexing optical transmission system as claimed in claim 1, wherein said wavelength selector has reflection type wavelength selection characteristics for reflecting the optical signal which is selectively filtered.

5. The wavelength-multiplexing optical transmission system as claimed in claim 1, wherein said wavelength selector has transmission type wavelength selection characteristics for transmitting the optical signal which is selectively filtered.

6. The wavelength-multiplexing optical transmission system as claimed in claim 1, wherein said wavelength selector comprises:

an optical circulator having a first port for inputting the plurality of received optical signals therethrough, a second port for outputting a plurality of optical signals inputted through said first port, and a third port for outputting the optical signals inputted through said second port; and an optical fiber cable having one end connected to said second port;

wherein said optical fiber cable comprises a fiber grating including a plurality of diffraction gratings which are formed in said optical fiber cable and have periods corresponding to the plurality of selected wavelengths; and wherein said wavelength shifting means applies a tension force to said optical fiber cable, thereby shifting the selected wavelengths of the wavelength selection characteristics, respectively.

7. The wavelength-multiplexing optical transmission system as claimed in claim 1, wherein said wavelength selector comprises:

an optical circulator having a first port for inputting the plurality of received optical signals therethrough, a second port for outputting a plurality of optical signals inputted through said first port, and a third port for outputting the optical signals inputted through said second port; and an optical waveguide having one end connected to said second port;

wherein said optical waveguide comprises a fiber grating including a plurality of diffraction gratings which are formed in said optical waveguide and have periods corresponding to the plurality of selected wavelengths; and wherein said wavelength shifting means heats said optical waveguide, thereby shifting the selected wavelengths of the wavelength selection characteristics, respectively.

8. The wavelength-multiplexing optical transmission system as claimed in claim 1, wherein said wavelength selector comprises:

an optical wavelength filter for filtering a predetermined wavelength band alone of the optical signals passing through said wavelength selector; and a Fabry-Pérot etalon, having a Fabry-Pérot etalon plate, for selectively filtering optical signals of a plurality of selected wavelengths from the optical signals passing through said wavelength selector;

wherein said optical wavelength filter and said Fabry-Pérot etalon are connected in series; and wherein said wavelength shifting means inclines said Fabry-Pérot etalon plate, thereby shifting the selected wavelengths of the wavelength selection characteristics, respectively.

9. The wavelength-multiplexing optical transmission system as claimed in claim 1, wherein said wavelength selector comprises:

an optical wavelength filter for filtering a predetermined wavelength band alone of the optical signals passing through said wavelength selector; and a Mach-Zehnder interferometer, in which one optical waveguide for transmitting the optical signal passing through said wavelength selector is branched into first and second optical waveguides, each having an optical path difference therebetween, and then said first and second optical waveguides are coupled with one another, said Mach-Zehnder interferometer selectively filtering optical signals of a plurality of selected wavelengths from the optical signals passing through said wavelength selector;

wherein said optical wavelength filter and said Mach-Zehnder interferometer are connected in series; and wherein said wavelength shifting means heats said second optical waveguide, thereby shifting the selected wavelengths of the wavelength selection characteristics, respectively.

10. The wavelength-multiplexing optical transmission system as claimed in claim 4, further comprising:

a plurality of said wavelength selectors connected in series;

wherein the selected wavelengths of said wavelength selectors are set, respectively, in said wavelength selectors, in such a manner that the wavelengths are different from one another, so that the wavelengths are allocated at the wavelength selection interval $\Delta\lambda$, and a selected wavelength group is formed.

11. The wavelength-multiplexing optical transmission system as claimed in claim 6, further comprising:

a plurality of said wavelength selectors connected in series;

wherein the selected wavelengths of said wavelength selectors are set, respectively, in said wavelength selectors, in such a manner that the wavelengths are different from one another, so that the wavelengths are allocated at the wavelength selection interval $\Delta\lambda$, and a selected wavelength group is formed.

12. The wavelength-multiplexing optical transmission system as claimed in claim 7, further comprising:

a plurality of said wavelength selectors connected in series;

wherein the selected wavelengths of said wavelength selectors are set, respectively, in said wavelength selectors, in such a manner that the wavelengths are different from one another, so that the wavelengths are allocated at the wavelength selection interval $\Delta\lambda$, and a selected wavelength group is formed.

* * * * *